(12) United States Patent
Nakatsuka et al.

(10) Patent No.: US 8,288,917 B2
(45) Date of Patent: Oct. 16, 2012

(54) SILICON OXIDE ELECTRET ELECTRODE WITH LAMINATE INSULATING FILM SURROUNDING SHORT CONDUCTIVE FILM

(75) Inventors: Hiroshi Nakatsuka, Osaka (JP); Keiji Onishi, Osaka (JP); Koji Nomura, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/125,674

(22) PCT Filed: Oct. 19, 2009

(86) PCT No.: PCT/JP2009/005443
§ 371 (c)(1),
(2), (4) Date: Jun. 27, 2011

(87) PCT Pub. No.: WO2010/047076
PCT Pub. Date: Apr. 29, 2010

(65) Prior Publication Data
US 2011/0260699 A1    Oct. 27, 2011

(30) Foreign Application Priority Data
Oct. 23, 2008  (JP) .............................. P 2008-272843

(51) Int. Cl.
*H02N 1/00* (2006.01)
(52) U.S. Cl. ..................... 310/309; 307/400; 381/191
(58) Field of Classification Search .................. 310/309; 381/191; 307/400; 322/3 A
See application file for complete search history.

(56) References Cited

U.S. PATENT DOCUMENTS

| | | | | |
|---|---|---|---|---|
| 7,956,497 B2 * | 6/2011 | Murayama et al. | ........... | 307/400 |
| 8,089,194 B2 * | 1/2012 | Naruse et al. | ................. | 310/309 |
| 8,102,097 B2 * | 1/2012 | Naruse et al. | ................. | 310/309 |
| 2004/0016120 A1 * | 1/2004 | Boland et al. | ................... | 29/886 |
| 2006/0113862 A1 * | 6/2006 | Suzuki et al. | ................. | 310/309 |

(Continued)

FOREIGN PATENT DOCUMENTS

JP            11-219851          8/1999
(Continued)

OTHER PUBLICATIONS

Sze et al., "Integrated single-inductor dual-input dual-output boost converter for energy harvesting applications", May 2008, Circuits and Systems, 2008 ISCAS 2008. IEEE International Symposium.*

(Continued)

*Primary Examiner* — Karl Tamai
(74) *Attorney, Agent, or Firm* — Wenderoth, Lind & Ponack, L.L.P.

(57) ABSTRACT

An electret electrode is constituted by forming a conductive film on a substrate, laminating a first insulating film and a second insulating film alternatively on the conductive film, and then disposing electret films in which a lower surface, an upper surface and a side surface are covered with a third insulating film and a fourth insulating film. Existing of the first insulating film and the second insulating film between the electret films and the conductive film enables an increase in electric field intensity in the film when the same electric charge is retained, while enables an increase in surface charge density (surface potential) when the electric field intensity is the same.

20 Claims, 9 Drawing Sheets

U.S. PATENT DOCUMENTS

| | | | |
|---|---|---|---|
| 2007/0029894 A1* | 2/2007 | Yamaoka et al. | 310/311 |
| 2007/0217635 A1* | 9/2007 | Ogura et al. | 381/191 |
| 2007/0272992 A1* | 11/2007 | Mori et al. | 257/416 |
| 2008/0111444 A1* | 5/2008 | Mabuchi | 310/309 |
| 2008/0218132 A1* | 9/2008 | Pelrine et al. | 322/2 A |
| 2010/0109472 A1 | 5/2010 | Naruse et al. | |
| 2011/0227545 A1* | 9/2011 | Nakatsuka et al. | 322/2 R |
| 2011/0260699 A1* | 10/2011 | Nakatsuka et al. | 322/2 R |
| 2011/0316384 A1* | 12/2011 | Nakatsuka et al. | 310/300 |

FOREIGN PATENT DOCUMENTS

| | | |
|---|---|---|
| JP | 2005-229707 | 8/2005 |
| JP | 2005-529574 | 9/2005 |
| JP | 2006-245398 | 9/2006 |
| JP | 2007-267273 | 10/2007 |
| JP | 2007-312551 | 11/2007 |
| WO | 03/105305 | 12/2003 |
| WO | 2008/053793 | 5/2008 |

OTHER PUBLICATIONS

International Search Report issued Nov. 24, 2009 in International (PCT) Application No. PCT/JP2009/005443.

"Harvesting Energy From Vibrations by a Micromachined Electret Generator", Transducers & Eurosensors '07 The 14th International Conference on Solid-State Sensors, Actuators and Microsystems, Lyon, France, pp. 129-132, Jun. 10-14, 2007.

"Stabilization of Positive Charge in $SiO_2/Si_3N_4$ Electrets", IEEE Transactions on Dielectrics and Electrical Insulation, vol. 13, No. 5, pp. 1049-1056, Oct. 2006.

International Preliminary Report on Patentability issued Feb. 22, 2011 in International (PCT) Application No. PCT/JP2009/005443.

Translation of International Preliminary Report on Patentability issued May 19, 2011 in International (PCT) Application No. PCT/JP2009/005443.

* cited by examiner (a)

(b)

(a)

(b)

20 Generator
21 Glass
22 Fixed Electrode
23 Movable Electrode
24 Suspended Mass
25 Electret
26 Silicon
27 Silicon
28 Load
29 Vibration

SILICON OXIDE ELECTRET ELECTRODE WITH LAMINATE INSULATING FILM SURROUNDING SHORT CONDUCTIVE FILM

BACKGROUND OF THE INVENTION

I. Technical Field

The present invention relates to an electret electrode, a static induction vibration power generator, an actuator and vibration power generating device using the electret electrode, and an electronic equipment using the vibration power generating device, and a communication device using the vibration power generating device.

II. Description of the Related Art

There has already been proposed a static induction vibration power generating device in which an electric charge is applied to one electrode of a variable capacity and the electric charge is induced to an opposed electrode through electrostatic induction, and then the electric charge to be induced is varied by changing of capacity and the change in the electric charge is taken out as electric energy (see, for example, JP2005-529574A (pages 10-11. FIG. 4)).

FIG. 7 shows the static induction vibration power generator described in aforementioned JP2005-529574A (pages 10-11, FIG. 4). FIG. 7 is a schematic sectional view of a vibration power generator 10 using an electret.

This static induction power generator is constituted from a first substrate 11 equipped with a plurality of conductive surface regions 13, and a second substrate 16 equipped with a plurality of electret material regions 15. The first substrate 11 and the second substrate 16 are mutually disposed at a predetermined distance. The second substrate 16 including the electret material regions 15 is fixed. The first substrate 11 including the conductive surface regions 13 are connected to a fixed structure 17 through spring 19. The spring 19 is connected to both side surfaces of the first substrate 11 and is also connected to the fixed structure 17. This spring 19 makes the first substrate 11 to return to the fixed position, or the first substrate can return to the fixed position by carrying out a lateral movement (for example, movement in an X-axis direction). This movement causes a variation in an overlapped area between the electret material regions 15 and opposed conductive surface regions 13, and thus a change in electric charge arises in the conductive surface regions 13. According to the static induction power generator, power generation is carried out by taking a change in electric charge as electric energy.

At this time, maximum output power $P_{max}$ is represented by the following equation:

$$P_{max} = \frac{\sigma^2 nAf}{4\frac{\varepsilon_{Electret}\varepsilon_0}{d}\left(1 + \frac{g\varepsilon_{Electret}}{d\varepsilon_{air}}\right)} \quad \text{[Equation 1]}$$

where $\sigma$ denotes a surface electric charge (density), $\varepsilon_{Electret}$ denotes a dielectric constant of an electret material, $\varepsilon_{air}$ denotes a dielectric constant of air, $\varepsilon_0$ denotes a dielectric constant of vacuum, A denotes an overlapped area between an electret material region and a conductive surface region, g denotes a gap between electrodes, f denotes a vibration frequency, d denotes a film thickness of an electret material, and n denotes the number of overlapped areas.

As is apparent from the equation, it is necessary to increase the surface electric charge (density) of the electret material, that is, a surface potential of the electret material so as to increase a power generation amount.

On the other hand, a silicon oxide film has been known as the electret material (see, for example, TRANSDUCERS & EUROSENSORS '07 The 14th International Conference on Solid-State Sensors, Actuators and Microsystems, Lyon, France, Jun. 10-14, 2007). Also, IEEE Transactions on Dielectrics and Electrical Insulation Vol. 13, No. October 2006 discloses an amount of charge to a silicon oxide film used as the electret material.

FIG. 8 is a schematic sectional view of a conventional static induction vibration power generator described in aforementioned TRANSDUCERS & EUROSENSORS '07 The 14th international Conference on Solid-State Sensors, Actuators and Microsystems, Lyon, France, Jun. 10-14, 2007, that is a generator (static induction vibration power generator) 20 using a silicon oxide film as the electret material. In FIG. 8, a fixed electrode 22 is formed on a glass 21. A suspended mass 24 is disposed on the glass 21 through adhesive bonding. A silicon substrate 26 with an electret 25 formed thereon is disposed on silicon 27 through adhesive bonding.

According to this static induction power generator, power generation is carried out by utilizing the fact that the suspended mass 24 including a movable electrode 23 is vibrated thereby causing a change in capacity of Cvar. In this static induction power generator, a silicon oxide film is used as the electret material. The electret material region is constituted by forming a silicon nitride film, a silicon oxide film and a silicon nitride film on an electrode, and is subjected to a heat treatment so as to stabilize the electric charge.

FIG. 9 is a graph showing a relationship between the time of electron charge (the time of electron charging) to a silicon oxide film and the surface potential described in aforementioned Non-Patent Document 2. The symbol "○" denotes a relationship between the time of electron charge and the surface potential when the thickness of a silicon oxide film is 0.5 micrometer, while the symbol "Δ" denotes a relationship between the time of electron charge and the surface potential when the thickness of a silicon oxide film is 0.6 micrometer. In both cases, the surface potential of the silicon oxide film increases as the time of electron charge becomes longer. When the surface potential arrives at a maximum value, the surface potential does not increase even when the time of electron charge is prolonged. In the silicon oxide film having a thickness of 0.5 micrometer, the maximum value of the surface potential is 240 V. In the silicon oxide film having a thickness of 0.6 micrometer, the maximum value of the surface potential is 290 V. Aforementioned Non-Patent Document 2 describes that the maximum value of the surface potential depends on a dielectric strength voltage (or breakdown voltage) of the silicon oxide film.

Accordingly, in the static induction vibration power generator using the silicon oxide film as the electret material, it is necessary to increase the dielectric strength voltage of the silicon oxide film, that is, the film thickness so as to improve the maximum output power by increasing the surface electric charge (density) of the electret material.

SUMMARY OF THE INVENTION

Problems to be Solved by the Invention

However, when the film thickness of the silicon oxide film is increased, cracks, warp of the substrate and the like occur due to internal stress of the film, and thus there was a limit on increase in thickness of the silicon oxide film. Accordingly, there was a problem that there was a limit on increase in surface potential (and surface charge density) through an increase in film thickness when the electret material is a silicon oxide film. This causes a problem such as low power generation efficiency due to low surface potential (surface charge density) when a silicon oxide film retaining an electric charge is used as an electret in the static induction vibration power generator.

The present invention has been made so as to solve aforementioned problems of the conventional art. An object of the present invention is to provide an electret electrode having such a structure that a surface potential increases even when a silicon oxide film ($SiO_2$ film) is used as an electret material. Another object of the present invention is to provide a vibration power generator in which power generation efficiency is improved by enhancing a surface potential of an electret using a silicon oxide film. Still another object of the present invention is to provide a vibration power generating device using the vibration power generator, and a communication device using the vibration power generating device.

The present invention provides an electret electrode, comprising:

a conductive film; a silicon oxide film retaining an electric charge; and an insulating film including a laminate. the laminate has a first insulating film and a second insulating film laminated between the conductive film and the silicon oxide film so that the first insulating film is disposed on a proximal side of the conductive film. With this constitution, it becomes possible to substantially increase a distance between regions where electric charge is retained and a conductive film in an electret and to increase a surface potential (surface charge density) when a silicon oxide film capable of hardly increasing the film thickness is used as the electret.

The electret electrode of the present invention preferably comprises: a third insulating film formed so as to cover a lower surface of the silicon oxide film; and a fourth insulating film formed so as to cover an upper surface and side surface of the silicon oxide film. With this constitution, since the silicon oxide film is completely covered with an insulating film, moisture resistance of the silicon oxide film is improved and thus discharge of the electric charge applied to the electret is prevented. As used herein, the lower surface of the silicon oxide film refers to a surface at the side in contact with the other layer or base substance when the silicon oxide film is formed, the upper surface refers to a wide surface exposed when the silicon oxide film is formed, and the side surface refers to a surface (a surface in parallel with a thickness direction) that connects the upper surface with the lower surface.

In case of including the third insulating film and the fourth insulating film, the electret electrode of the present invention may be configured so that the third insulating film is a second insulating film, and each one of the first insulating film and the second insulating film is included. In that case, the first insulating film is located between the second insulating film and the conductive film. The third insulating film and the second insulating film are made common, thereby making it possible to decrease the number of times of formation of the insulating film.

It is also preferred that the electret electrode of the present invention has such a constitution that a side surface of the first insulating film and a side surface of the second insulating film are not covered with the other conductive film or the other insulating film. With the constitution, an electric charge charged on the insulating film other than the electret removes from the side surface. Therefore, it becomes possible to retain an electric charge only in the electret by heating or humidification, and thus characteristics can be stabilized.

The present invention also provides a vibration power generator using the electret electrode of the present invention. As described above, since a surface potential (a surface charge density) can be enhanced in the electret electrode of the present invention, an attempt can be made to improve power generation efficiency according to vibration power generator of the present invention using the electret electrode of the present invention.

The present invention also provides a vibration power generating device including the vibration power generator of the present invention. The amount of power generation of the vibration power generating device of the present invention is more than that of a conventional vibration power generator including a silicon oxide film as the electret.

The vibration power generating device of the present invention may include an electric storage circuit. Inclusion of the electric storage circuit enables accumulation of power in the electric storage circuit in case of a large output power from the vibration power generator. The power accumulated in the electric storage circuit is supplied when the output power from the power generator decreases, thereby making it possible to stably retain the output of the vibration power generating device.

The present invention also provides a communication device including the vibration power generating device of the present invention. The communication device of the present invention can decrease the number of times of battery replacement when compared with those driven only by a battery, or can eliminate the need of battery replacement depending on the application.

The electret electrode of the present invention can enhance a surface potential (a surface charge density) of an electret electrode using a silicon oxide film as the electret. Therefore, according to the vibration power generator of the present invention using this electret electrode, it is possible to improve the power generation efficiency when compared with a conventional vibration power generator using the silicon oxide film as the electret.

Also, the vibration power generating device of the present invention includes the vibration power generator of the present invention and can supply a power of comparatively high output. Furthermore, when the vibration power generating device of the present invention includes the electric storage circuit, the output voltage can be stabilized. The vibration power generating device of the present invention can function as a power supply of a communication device. The vibration power generating device of the present invention enables power generation by a force applied from the outside (for example, a force applied during human walking, vibration applied during driving or the like). Therefore, the communication device using the vibration power generating device of the present invention is also advantageous from the view point of resource saving and environmental protection, for example, the number of times of maintenance such as battery replacement can be decreased.

DETAILED DESCRIPTION OF THE INVENTION

Embodiments of the present invention will be described with reference to the accompanying drawings.

First Embodiment

Figure 1:
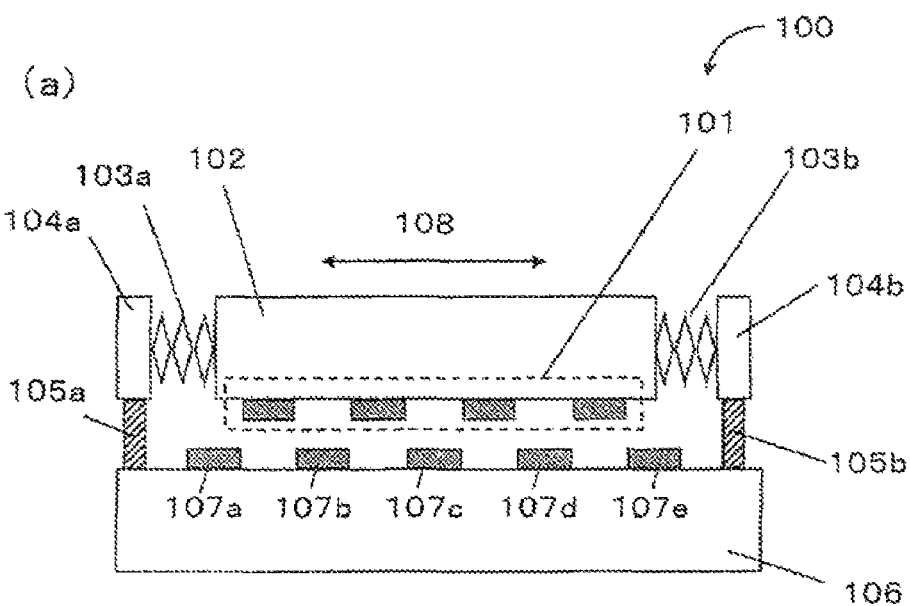
FIG. 1(a) a sectional view of a vibration power generator in the first embodiment of the present invention.
FIG. 1(b) is an enlarged sectional view of an electret electrode portion 101 shown in FIG. 1(a).
Figure 1:
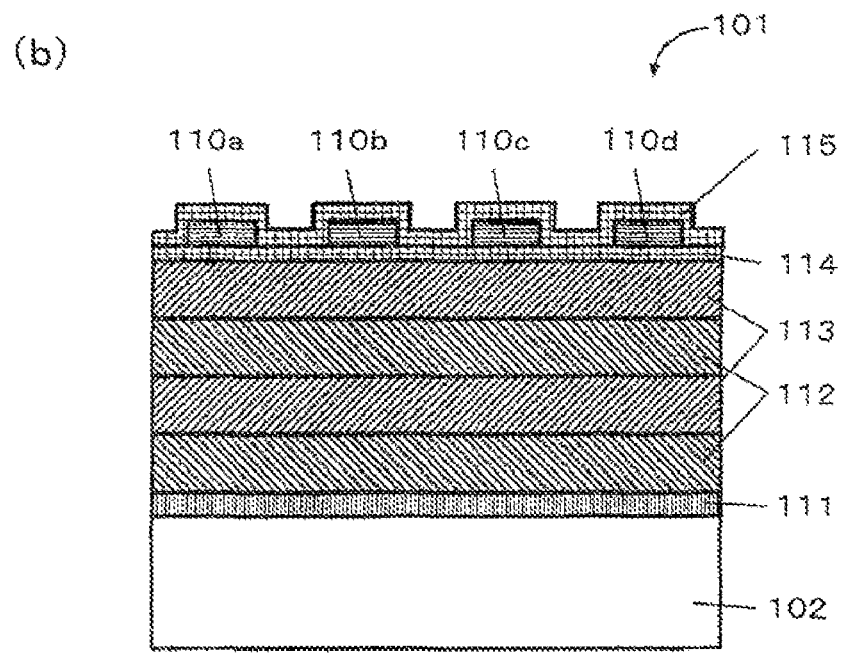

FIG. 1 shows a vibration power generator in the first embodiment of the present invention, in which FIG. 1(a) is a sectional view of a vibration power generator 100 and FIG. 1(b) is an enlarged sectional view of an electret electrode portion 101.

In FIG. 1(a), the vibration power generator 100 includes first substrate 102 including an electret electrode portion 101, elastic structural bodies 103a, 103b that connect the first substrate 102 to fixed structural bodies 104a, 104b, and a second substrate 106. The fixed structural bodies 104a, 104b are connected to the second substrate 106 by supports 105a, 105b. On the second substrate 106, electrodes 107a, 107b, 107c, 107d, 107e are formed.

In FIG. 1(b), the electret electrode portion 101 includes the first substrate 102, and a conductive film 111 formed on the first substrate. On the conductive film 111, a first insulating film 112 and a second insulating film 113 are alternately laminated to form an insulating film having a four-layered structure. On a surface of the finally formed second insulating film 113, electrets 110a, 110b, 110c, 110d whose lower surface, upper surface and side surface are covered with a third insulating film 114 and a fourth insulating film 115 are formed. Specifically, the third insulating film 114 is formed on second insulating film 113, and then electret films 110a, 110b, 110c, 110d are formed and, further, the fourth insulating film 115 is formed. In case of using a silicon oxide film as the electret in such a manner, the silicon oxide film is preferably sealed with an insulating film so that any surface (upper surface, lower surface and side surface) is not exposed, and also the silicon oxide film is not directly contacted with the other film or substrate.

The conductive film 111 may be constituted from any material having conductivity, such as metal, and is preferably made of polysilicon. In case of using the silicon oxide film as the electret, it becomes possible to form a film in a LP-CVD process including high-temperature processing, and thus a high-quality electret film can be obtained. Also in case of using, in addition to the electret, a silicon oxide film, a silicon nitride film and the like as the insulating film, a large effect is exerted, for example, high-temperature processing becomes possible.

The electret electrode portion 101 with this configuration is disposed so that the electret films 110a, 110b, 110c, 110d and the electrodes 107a, 107b, 107c, 107d, 107e are mutually opposed with an interval therebetween.

In the vibration power generator according to the present invention, a plurality of the electret films 110 (110a, 110b, 110c, 110d) and/or a plurality of the electrodes 107 (107a, 107b, 107c, 107d, 107e) are preferably disposed. The reason is that it is possible to obtain larger change (variation) in an overlapped area can be obtained even through small vibration by properly disposing a plurality of electrets and/or electrodes when compared with the case of disposing one electret and/or electrode having the same surface area.

In an example shown in FIG. 1(a), the electret film 110 and the electrode 107 are disposed by shifting the position in a lateral direction (position in a crosswise direction of FIG. 1(a)). Since the overlapped area between the electret film 110 and electrode 107 may vary by vibration of the first substrate 102 in a lateral direction, the electret film 110 and the electrode 107 may be disposed by shifting as shown in FIG. 1(a) in an initial state (a state where the first substrate 102 is not vibrated), and may also be disposed so as to mutually overlap.

In the electret electrode of the present invention, a silicon oxide film retaining an electric charge (or a film of oxide of silicon) is used as an electret (an electret film). Since the silicon oxide film is excellent in dielectric breakdown voltage and heat resistance, deterioration or deformation does not arise even in case of reflow at the time of mounting. Therefore, it is as described in Background Art of this application that the silicon oxide film has already been used as the electret.

In order to improve moisture resistance, it is desired that the silicon oxide film as the electret is entirely covered with an insulating film. Specifically, an electret having excellent dielectric breakdown voltage property, heat resistance and moisture resistance can be obtained by providing the silicon oxide film with a structure in which the entire periphery is completely covered with an insulating film such as a silicon nitride film.

In the embodiment shown in the drawing, the first insulating film 112 and the second insulating film 113 are formed by selecting a proper insulating material so that a material of the second insulating film 113 to be contacted with the third insulating film 114 is different from that of the third insulating film 114. For example, when the third insulating film 114 is a silicon nitride film, the second insulating film 113 is preferably a silicon oxide film and the first insulating film 112 is preferably a silicon nitride film. Since a silicon oxide film exists every other layer in a laminated structure including the electret by using the second insulating film as the silicon oxide film, a laminated structural body with less warp or distortion can be obtained. Also since a silicon nitride film exists every other layer in a laminated structure including the fourth insulating film by using the first insulating film as the silicon nitride film, a laminated structural body with less warp or distortion can be obtained. Alternatively, the first insulating film 112 may be a film made of an inorganic material other than the silicon nitride film and may be, for example, made of a plasma nitrided film.

The embodiment shown in FIG. 1 illustrates a configuration in which the first insulating film 112 and the second insulating film 113 are alternately formed. In Modification, the third insulating film may also serve as the second insulating film. In that case, the first insulating film may be located between the third insulating film and the conductive film. In FIG. 1, the insulating film having a four-layered structure may also have a single-layered structure. With such a configuration, the number of times of film formation can be decreased. In the constitution, the first insulating film (the single-layered insulating film) is preferably a silicon oxide film. Alternatively, the insulating film may have a three layered structure in which the first insulating film, the second insulating film and the first insulating film are laminated from the side of the conductive film. In that case, the second insulating film may be formed of the same material as that of the third insulating film (for example, a silicon nitride film), and the first insulating film may be formed of the other inorganic material (for example, a silicon oxide film).

Alternatively, if possible, the third insulating film may be formed in the thickness more than that of the fourth insulating film to give a configuration including no first and second insulating films. In that case, unnaturalness of the absence of the first and second insulating films may be avoided by calling the fourth insulating film as an insulating film A and calling the third insulating film as an insulating film B.

Alternatively, in the embodiment shown in FIG. 1, the first insulating film 112 and the second insulating film 113 may be made of the same material. In that case, it is preferred to make the physical properties of mutually adjacent films different by appropriately controlling film formation condition so that the density of the film is different in the first insulating film 112 and the second insulating film 113.

Also in case of forming the first and second insulating films in any manner (in the embodiment in which the material is the same or different), it is preferred to form by selecting the material and/or physical properties of the first insulating film 112 and the second insulating film 113 so as to relieve stress at the time of mutual film formation (formation of each film) (residual stress generated in the obtained insulating film). The stress at the time of film formation can be relieved by selecting a combination of the first insulating film 112 and the second insulating film 113 so that the residual stress produced on the exposed surface in the case of forming the other of the first insulating film 112 and the second insulating film 113 becomes compressive stress, when the residual stress produced on the exposed surface in the case of forming one of the first insulating film 112 and the second insulating film 113 is tensile stress.

That is, stress relieving at the time of film formation refers to, for example, formation of the other film by selection of a material that enables the exposed surface of the film to form a recess at the conductive film side in case stress is produced so as to enable the exposed surface of the film to form a protrusion at the conductive film side when one film is formed.

As shown in FIG. 1(b), it is desired that side surfaces of the first insulating film 112 and the second insulating film 113 are not covered with a conductive film or an insulating film, that is, exposed. With such a constitution, an electric charge other than that charged to an electret film is diffused into a peripheral space even when the second insulating film 113 is made of the same silicon oxide film as that of the electret. As a result, it becomes possible to obtain a stable electret electrode.

The thickness of the first insulating film 112 and that of the second insulating film 113 are selected taking characteristics (brittleness, hardness and the like) of each insulating film into consideration so that a distance between the electrets 110a to 110d and the conductive film 111 becomes the length required to obtain a desired surface potential on the surface of the electret electrode. For example, the distance between the electrets 110a to 110d and the conductive film 111 may be adjusted to about 1 μm. In that case, the first insulating film 112 having a thickness of 100 nm and the second insulating film 113 having a thickness of 100 nm may be laminated so that the total layers becomes 10 layers of each 5 layers.

Next, an action of a vibration power generator constituted as shown in FIG. 1(a), using the electret electrode constituted as described above, will be described.

In the vibration power generator 100, when a force or vibration 108 from the outside is applied, the elastic structural bodies 103a and 103b undergoes expansion and contraction, whereby, the first substrate 102 undergoes displacement relative to the second substrate 106. This relative displacement brings about variation in the overlapped area between the electret electrode portion 101 (particularly electrets 110a to 110d) and the electrodes 107a to 107e disposed on the second substrate. The variation in the overlapped area causes variation in the amount of the electric charge induced into the electret electrode portion 101. Power generation is carried out by taking out the variation in electric charge as electric energy. As long as the first substrate 101 is continuously vibrated, this overlapped area continuously varies.

According to the vibration power generator 100 of the embodiment of the present invention, the effect capable of increasing a surface charge density (a surface potential) of the electret film can be obtained. This effect will be described in detail below.

The electret films 110a to 110d are formed on a laminate composed of the first insulating film 112 and the second insulating film 113 formed on the conductive film 111. Accordingly, the electric field generated by the electric charge retained on the electret films 110a to 110e exists in the electret films 110a to 110e, the third insulating film 114, and the first and second insulating films 112 and 113. As a result, a distance between the region where the electric charge is retained, and the conductive film 111 increases. In case the same electric charge is retained, the electric field intensity decreases. In case of the same electric field intensity, it becomes possible to increase the surface charge density (surface potential).

In the electret composed of a silicon oxide film, dielectric breakdown arises at about 5 MV/cm. Therefore, for example, when the silicon oxide film has a thickness of 1 micrometer, the surface potential of 500 V is the limit. To the contrary, when a 1 micrometer thick insulating layer (a silicon oxide film and a silicon nitride film that have the same degree of a withstand voltage) is formed between the insulating film and the conductive film 111, it becomes possible to increase the limit of the surface potential to 1,000 V.

In the embodiment shown in FIG. 1(a), there is shown the constitution in which the conductive film 111 is formed, as one continuous film, entirely below the electret film 110.

As shown in FIG. 2(a), the conductive film may be formed only at the position corresponding to electret films 120a to 120d below electret films 120a to 120d (conductive films 121a to 121d are formed only at the lower portion of the position where electret films 120a to 120d exist in the example shown in FIG. 2(a)). Alternatively, electrets are preferably disposed so as to correspond to the conductive film (electret films 120a to 120d are disposed only at the upper portion of the portion where conductive films 121a to 121d exist in the example shown in FIG. 2(a)).

There is an advantage that much more electric charge can be applied to the electret film at the time of charging by making the position of the electret films 120a to 120d (position in a crosswise direction of FIG. 2(a)) to corresponding (making agree with) to that of the conductive films 121a to 121d.

That is, it is possible to suppress the electric field from extending outside the electret film in case of applying a predetermined voltage between the electret film and the conductive film for charging by making the position of the electret film corresponding to that of the conductive film. As a result, it becomes possible to apply much more electric charge to the electret when compared with in case of using a wide one conductive film, even when the same voltage is applied.

Figure 2:
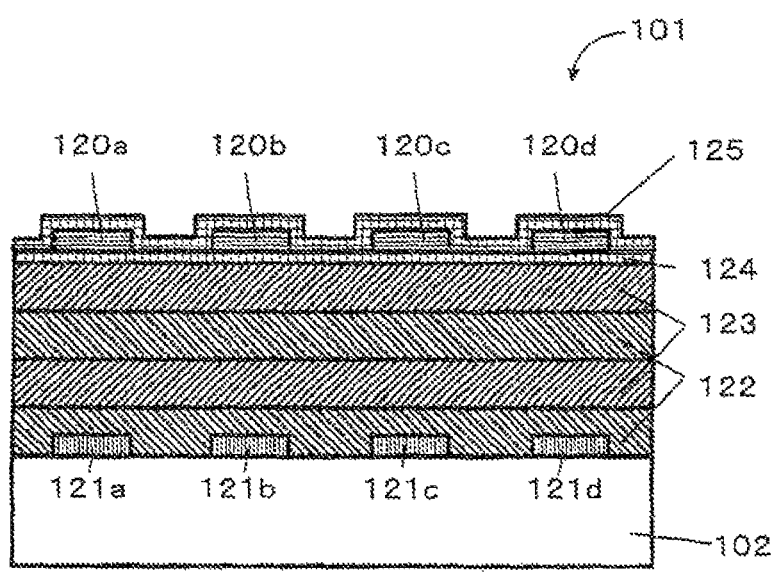
FIG. 2(a) and FIG. 2(b) are enlarged sectional views showing another configuration of an electret electrode portion in the first embodiment of the present invention.
Figure 2:
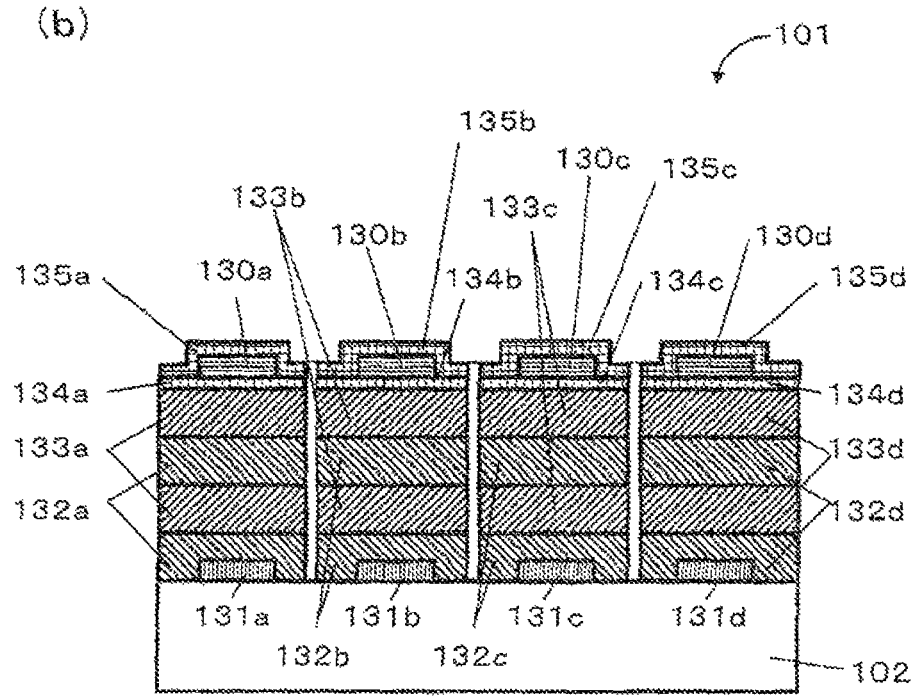

In FIG. 2, the symbol 122 corresponds to a first insulating film, the symbol 123 corresponds to a second insulating film, the symbol 124 corresponds to a third insulating film, and the symbol 125 corresponds to a fourth insulating film. Since the functions and materials of the electrets 120a to 120d and the respective insulating films are as described above with reference to FIG. 1, the descriptions thereof are omitted herein.

As shown in FIG. 2(b), in case conductive films 121a to 121d are formed apart from each other, as shown in FIG. 2(b), a first insulating film 132 and a second insulating film 133 may be formed by dividing into sections a to d corresponding to electrets 130a to 130d and conductive films 131a to 131d to form a gap between the sections. Whereby, it is possible to more effectively diffuse electric charge applied to the portion other than the electret into a peripheral space. More specifically, the first insulating film 132 and the second insulating film 133 are formed so as to become 132a to 132d and 133a to 133d, respectively. The gap between sections may be formed after forming the first insulating film and the second insulating film. Since the functions and materials of these electrets as well as first and second insulating films are as described above in detail with reference to FIG. 1, the descriptions thereof are omitted therein. In FIG. 2(a), the symbol 134 corresponds to the third insulating film and the symbol 135 corresponds to the fourth insulating film. The functions and materials of these insulating films are as described above in detail with reference to FIG. 1, the descriptions thereof are omitted therein.

In the embodiments shown in FIG. 1(b), FIG. 2(a), and FIG. 2(b), although the conductive film 111 (121a to 121d, 131a to 131d) is directly formed on the substrate 102, it is preferred that an insulating film such as a thermal oxide film is formed on the substrate and a conductive film is formed on the insulating film.

As the substrate 102, for example, a conductive substrate such as a silicon substrate is usually used. When the conductive film is directly formed on such a conductive substrate, in case of applying a voltage between the electret film and the conductive film at the time of charging, the electric field expanding outside the electret (in a crosswise direction of FIG. 2(a)) between the electret and the conductive substrate may be generated, resulting in a decrease of the electric charge to be applied to the electret.

However, there is exerted the effect capable of preventing the generation of the electric field between the electret and the substrate and applying much more electric charge to the electret by forming an insulating layer between the conductive film and the conductive substrate.

It is also possible to obtain the same effect by using, as the substrate 102, an insulating substrate, for example, a silicon substrate having a high resistivity or a glass substrate in place of forming an insulating layer between the conductive film and the substrate.

In the present embodiment, a silicon oxide film is used as the electret. If possible, the electret may be formed from an electret material other than the silicon oxide film. Also in that case, the same effect can be obtained by appropriately selecting a first insulating film and a second insulating film depending on the electret material.

In case of using the silicon oxide film as the electret, not only a positive electric charge but also a negative electric charge can be applied to the electred. Therefore, the electret electrode portion 101 may be constituted by alternately disposing an electret film having a positive electric charge and an electret film having a negative electric charge. With such a constitution, a high utilization effect is exerted, for example, it becomes possible to enhance an output power by vibration.

In the present embodiment, an example of a vibration power generator is described. Also in an apparatus (or a device) that is other than the vibration power generator and also requires a high surface charge density, the constitution of the electret electrode of the present invention is effective. For example, the electret electrode of the present invention may be used so as to constitute an actuator. In the actuator, as the surface charge density of the electret film becomes higher, the force to be generated becomes larger.

Second Embodiment

Figure 3:
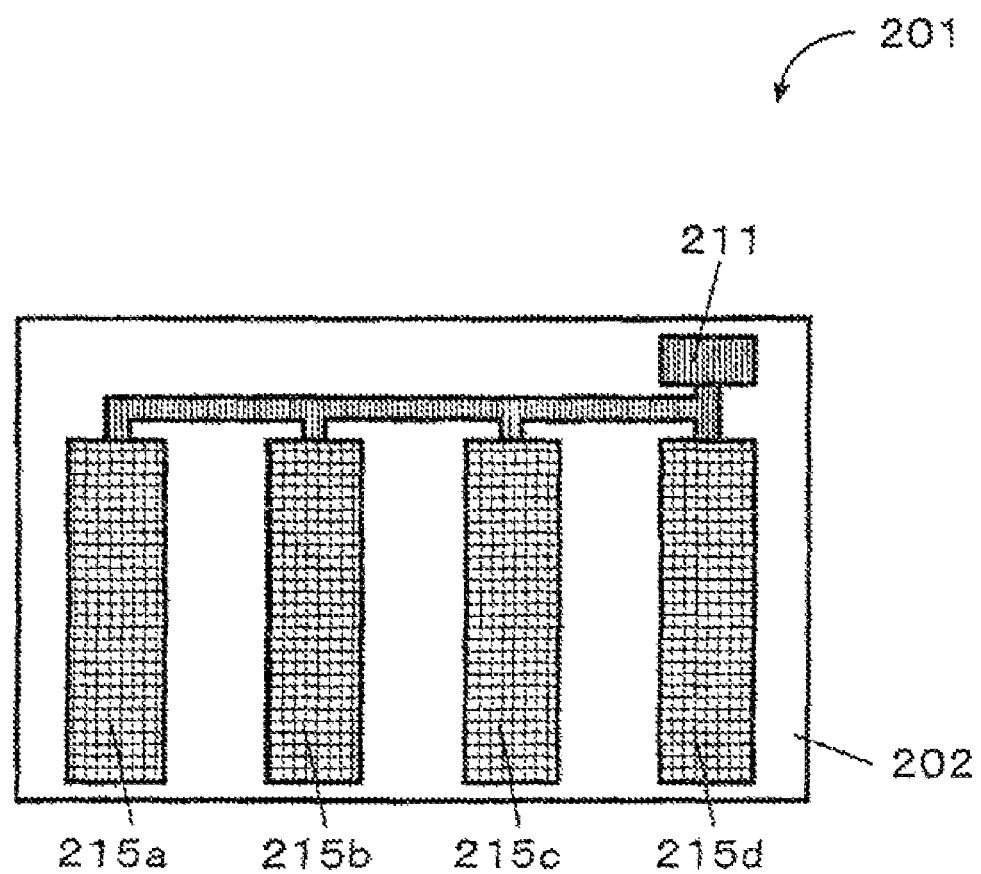
FIG. 3 is a top view showing a structure of a vibration power generator in the second embodiment of the present invention.

FIG. 3 is a top view of an electret electrode portion in the first embodiment of the present invention.

In FIG. 3, an electret electrode portion 201 is constituted from a conductive film 211, a second insulating film 215 (215a, 215b, 215c, 215d) and a substrate 202. The cross section of this electret electrode portion 201 is, for example, the same as that shown in FIG. 2(b).

In the second embodiment, the conductive film 211 serves as a counter electrode of the electric charge retained on an electret film 130 in the electret electrode portion 201, and the conductive film 211 is electrically connected, for example, to a GND terminal. By constituting in such a manner, a surface potential of the electret film surface is fixed, and thus making it possible to output an alternating-current signal around GND as a center (GND level centered alternating-current signal) in a power generator. Therefore, the electret electrode with such a constitution can be advantageously used. In FIG. 3, the electret may be, for example, in a rectangular form measuring 50 to 300 µm×several hundreds of µm to several mm, and a distance between adjacent electrets may be about the length of the short side of the electret.

Next, only specific characteristics obtained by the use of the present embodiment among actions of a vibration power generator using the electret electrode of the present embodiment will be described.

In the vibration power generator, the overlapped area between the electrode 107 (107a to 107e) and the electret film 130 (130a to 130d) varies by external vibration. Power generation is carried out by taking out an electric charge induced into the electrode 107 through variation of this overlapped area, as electric energy. At this time, since the electrode 107 is integrally formed so as to obtain the same potential, one electric terminal exists. Therefore, one of the electrode terminals of the load is connected to the electrode 107, while the other one is connected to GND. Such connection enables generation of an output in which an alternate current (AC) component by power generation and a direct current (DC) component to be supposed on the electret film 130 are combined. However, it becomes possible to remove the DC component by ground-contacting the conductive film 211 constituting the electret electrode portion 201 to GND.

As a result, since the generated power becomes an AC signal around GND as a center, it is possible to obtain the effect capable of carrying out circuit design taking only an AC power into consideration.

Also, in the electret electrode portion shown in the present embodiment, it is possible to utilize the conductive film 211 as reference potential in a charging process of the electret and thus the utilization effect is great.

In the present embodiment, an example in which the electret electrode portion has a sectional structure shown in FIG.

2(b) is described. Even when the electret electrode has the structure shown in FIG. 1(b) or FIG. 2(a), the same effect is obtained as a matter of course.

Third Embodiment

Figure 4:
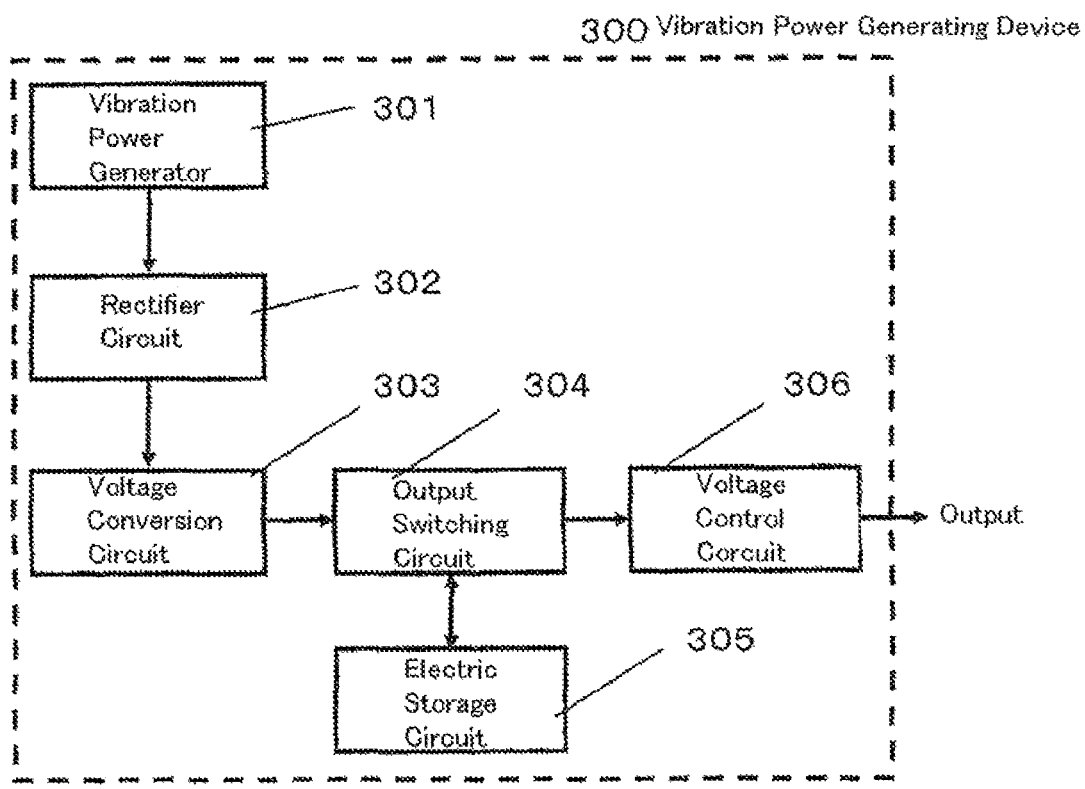
FIG. 4 is a block diagram showing a vibration power generating device in the third embodiment of the present invention.

As the third embodiment of the present invention, a vibration power generating device will be described. FIG. 4 is a block diagram of a vibration power generating device 300. In FIG. 4, the vibration power generator is a vibration power generator shown as the first embodiment or the second embodiment.

In FIG. 4, the vibration power generating device 300 includes a vibration power generator 301, a rectifier circuit 302, a voltage conversion circuit 303, an output switching circuit 304, an electric storage circuit 305, and a voltage control circuit 306. An AC voltage output from the vibration power generator 301 is converted into a DC voltage by the rectifier circuit 302. The DC voltage is input in the voltage conversion circuit 303 and then subjected to voltage conversion up to an output voltage level of the vibration power generating device 300. The converted voltage is input to the voltage control circuit 306, or the electric storage circuit 305 by the output switching circuit 304. In the voltage control circuit 306, a voltage is output so as to control the output voltage to a given constant value.

Figure 5:
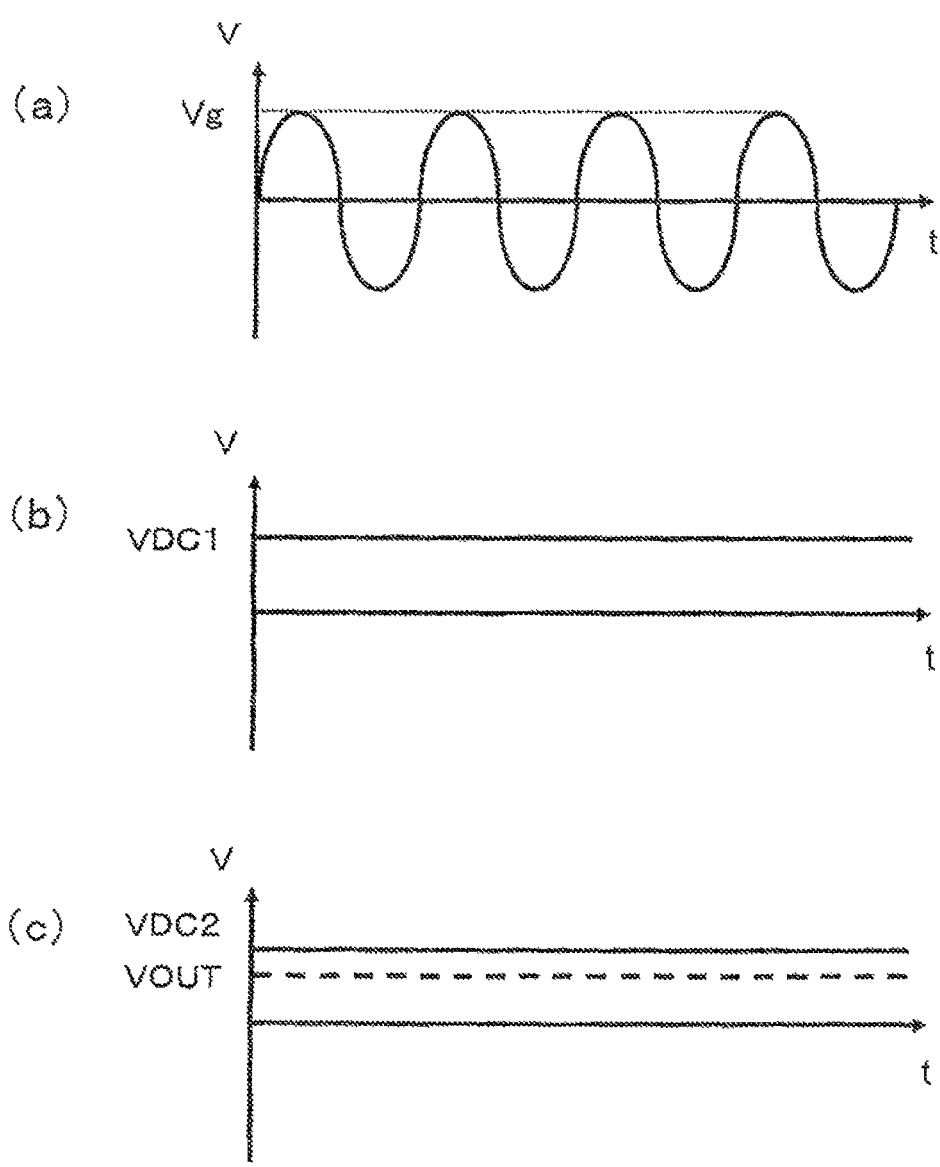
FIG. 5 is a graph showing a voltage waveform of each portion of a vibration power generating device in the third embodiment of the present invention.

The action of the vibration power generating device 300 constituted as described above will be described with reference to FIG. 5. FIG. 5 is a voltage waveform to be output from each circuit of the vibration power generating device 300. FIG. 5(a) is an output voltage waveform of the vibration power generator 301. In the present embodiment, for convenience, assumed that the power generation is efficiently carried out even when a displacement direction of the first substrate varies, a sinusoidal voltage is output by variation of the overlapped area through vibration. As used herein, a voltage amplitude Vg of output voltage of a vibration power generator 301 varies depending on the vibration amplitude of the first substrate, a gap between the first substrate and second substrate, an amount of electric charges retained by the electret and a magnitude of an external impedance viewed from the vibration power generator 301 and the like. The AC voltage output from the vibration power generator 301 is converted into a DC voltage VDC1 by the rectifier circuit 302 (FIG. 5(b)). VDC1 is subjected to voltage conversion up to the output voltage level VDC2 of the vibration power generating device 300 by the voltage conversion circuit 303.

In case it is unnecessary to output a voltage from the vibration power generating device 300, the output switching circuit 304 plays a role of sending the output from the voltage conversion circuit 303 to the electric storage circuit 305, not to the voltage control circuit 306. The electric storage circuit 305 stores the generated power. In case it is necessary to output a voltage from the vibration power generating device 300, the output switching circuit 304 switches a circuit so as to output a power from the voltage control circuit 306. In case the amount of power generation is small, the output switching circuit 304 further switches a circuit so as to output the power stored in the electric storage circuit 305. The output from the output switching circuit 304 is controlled to a desired output voltage VOUT by the voltage control circuit 306 and then output out of the vibration power generating device 300 (FIG. 5(c)).

As described above, the output voltage of the vibration power generator 300 varies depending on various factors. In order to respond thereto, it is desired that VDC2 is finally set at a voltage that is slightly higher than the voltage VOUT to be finally output. It becomes possible to maintain an output voltage at a given constant value even in case of micro-variation in voltage by performing such setting. The case of outputting a power at a voltage of 1.8 V will be described as an example. In this case, when VDC2 is set at 1.8 V and also an output voltage of the vibration power generator decreases, an output voltage of the vibration power generator 300 also decreased. However, when VDC2 is set at 2 V, it becomes possible to sufficiently control against a decrease in voltage by 0.2 V. Accordingly, it is possible to make an output voltage at a given constant value and to stably supply a power by setting to satisfy the following inequality expression: VDC2>VOUT.

Fourth Embodiment

Figure 6:
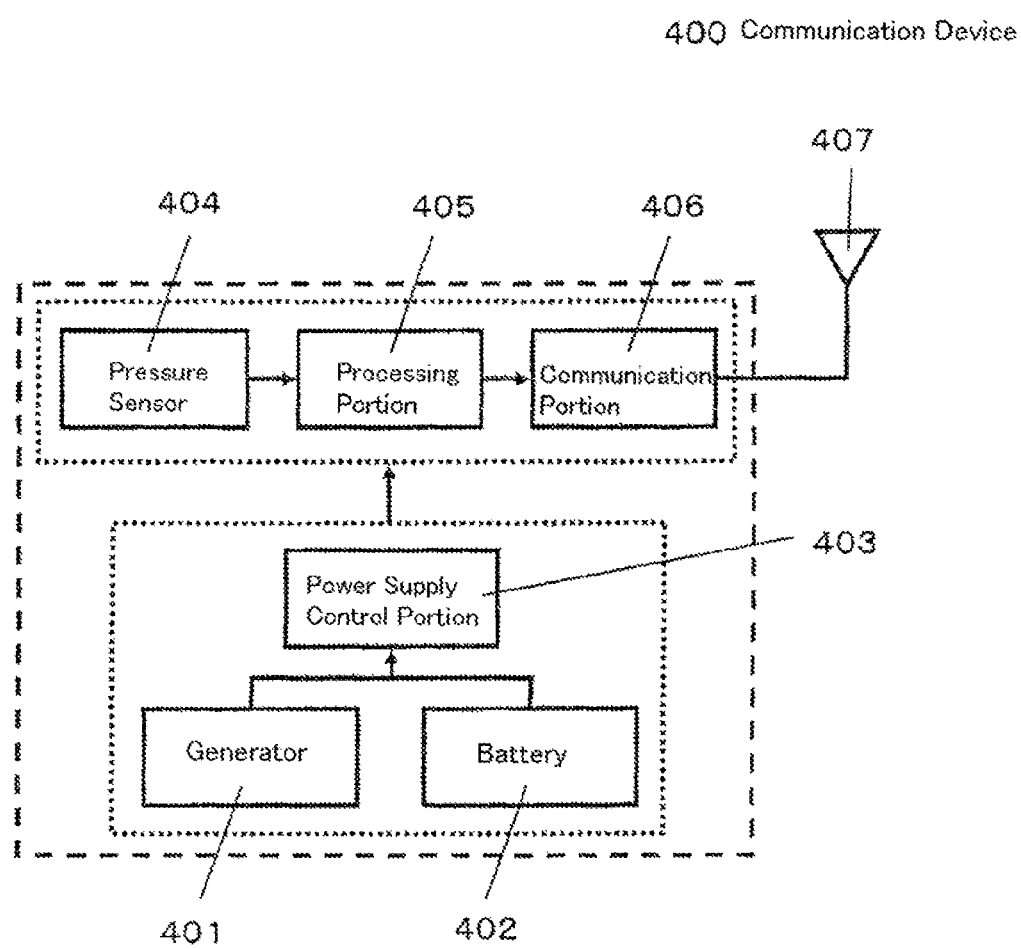
FIG. 6 is a diagram showing a communication device in the fourth embodiment of the present invention.
Figure 7:
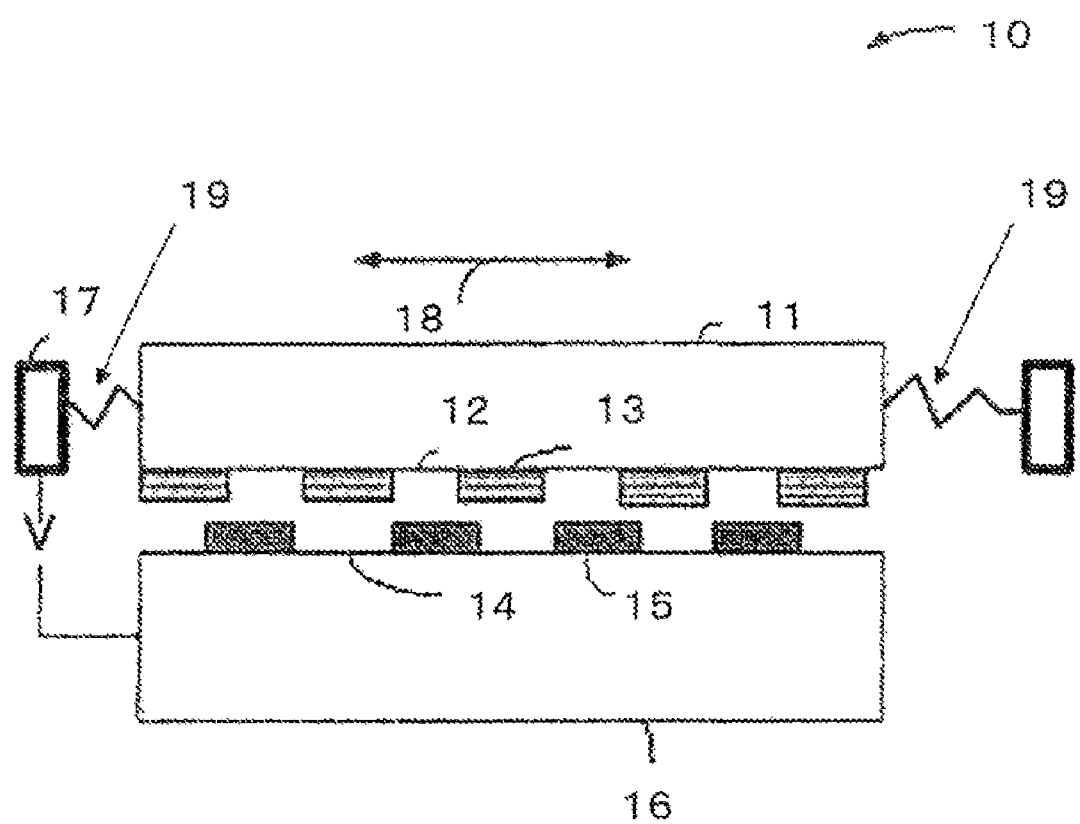
FIG. 7 is a top view of a conventional static induction vibration power generator.
Figure 8:
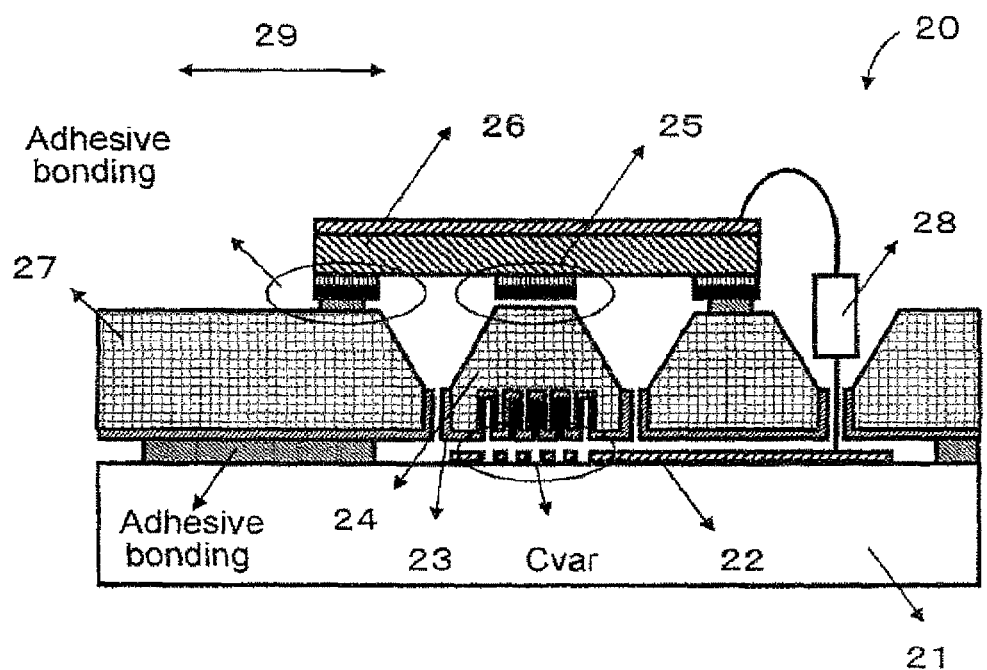
FIG. 8 is a sectional view of a static induction vibration power generator using a conventional silicon oxide film.
Figure 9:
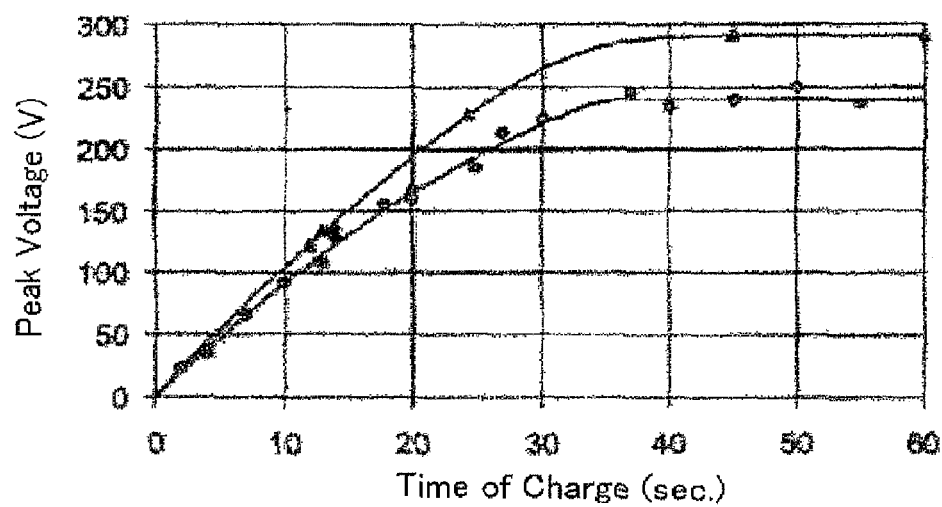
FIG. 9 is a graph showing a relationship between the time of electron charge to a silicon oxide film of the static induction vibration power generator shown in FIG. 9, and the surface potential.

FIG. 6 is a block diagram of a communication device used in a tire pneumatic pressure monitoring system mounted in an automobile. In FIG. 6, a power generating device shows a vibration power generating device in the third embodiment.

In FIG. 6, a communication device 400 includes a power generating device 401 to perform power generation by vibration; a battery 402 as a main power supply of a communication device or a sub power supply of a power generating device 401; a power supply control portion 403 to switch an output from a power generating device 401 to an output from a battery 402, and to supply the output to a circuit portion; a pressure sensor 404 to measure a tire pneumatic pressure of a tire; a processing portion 405 to process an output from a pressure sensor and to transfer the output to a communication portion; a communication portion 406 to convert a input signal from the processing portion 405 into a high frequency signal, and to transfer the high frequency signal to an antenna 407; and the antenna 407.

The action of the communication device 400 constituted above will be described below.

The power required for the pressure sensor 404, the processing portion 405 and the communication portion 406 to cause an action is supplied from the power generating device 401 or the battery 402 through the power supply control portion 403. The pressure sensor 404 measure a pneumatic pressure of a tire, converts the measurement results into a voltage signal, and inputs the voltage signal to the processing portion 405. The signal processed in the processing portion 405 is input to the communication portion 406 and then transferred from antenna 407 as a high frequency signal.

In the communication device operating in such a manner, in case the vibration power generating device is utilized as the power supply of the communication device, it is possible to decrease the number of times of a maintenance operation such as battery replacement, or to make battery replacement unnecessary. This not only improves convenience of the communication device, but also contributes to resource saving and environmental protection.

In the present embodiment, an example using a vibration power generating device and a battery in combination is illustrated. If an output power from the vibration power generating device can sufficiently supply a power consumed in circuits of a pressure sensor, a processing portion, communication portion and the like, and a power required to communication, only the vibration power generating device may be used as a power supply. In that case, a battery and a power supply control portion become unnecessary and thus it is advantageous from the viewpoint of miniaturization of equipment.

In the present embodiment, examples using the vibration power generator and the vibration power generating device shown in the first embodiment to third embodiment are illustrated. In the vibration power generator, the other vibration power generator may be used as long as it can convert the force or vibration from the outside into a power and, it that case, the same effect is obtained as a matter of course.

The vibration power generator and the vibration power generating device of the present invention may be used as a main power supply or an auxiliary power supply in an electronic equipment other than a communication device. Specifically, they can be used in wristwatchs, thermometers, temperature indicators, pedometers, remote controllers, mobile audio products, portables for keyless entry, hearing aids, heart pacemakers, mobile telephones and gaming machines.

The embodiments disclosed herein are in all respects merely examples and should in no way be construed as limiting. The scope of the invention is indicated not by the foregoing description but by the scope of the claims, and is intended to include all modifications that are within the scope and meanings equivalent to the scope of the claims.

Since the constitution the electret electrode of the present invention makes it possible to obtain a high surface potential or a surface charge density, the electret electrode is useful as an electret electrode of a static induction vibration power generator, or advantageously used in an electrostatic actuator. Also, the vibration power generator of the present invention is very useful as a power supply in applications such as a small-power wireless communication module.

The invention claimed is:

1. An electret electrode, comprising:
   a plurality of conductive films spaced apart from each other;
   a plurality of silicon oxide films retaining an electric charge and being disposed above the plurality of conductive films; and
   an insulating film disposed between the plurality of conductive films and the plurality of silicon oxide films, the insulating film including a laminate having a first insulating film and a second insulating film so that the first insulating film is disposed on a proximal side of the plurality of conductive films,
   wherein the plurality of conductive films is disposed such that the conductive films are only below a region where the plurality of silicon oxide films retaining an electric charge is disposed, and
   wherein the plurality of conductive films is surrounded by the first insulating film and the width of the plurality of conductive films is shorter than that of the first insulating film.

2. The electret electrode according to claim 1, wherein at least one of the first insulating film and the second insulating film includes two or more layers of.

3. The electret electrode according to claim 1, further comprising:
   a third insulating film disposed so as to cover a lower surface of the silicon oxide film, and
   a fourth insulating film disposed so as to cover an upper surface and side surface of the silicon oxide film.

4. The electret electrode according to claim 3, wherein the third insulating film and second insulating film are the same insulating film, and the first insulating film is located between the second insulating film and the plurality of conductive films.

5. The electret electrode according to claim 3, wherein the third insulating film is made of the same material as that of either the first insulating film or the second insulating film, and at least one of the first insulating film and the second insulating film includes two or more layers of.

6. The electret electrode according to claim 1, wherein the first insulating film and the second insulating film are a silicon nitride film and a silicon oxide film, respectively.

7. The electret electrode according to claim 1, wherein the first insulating film and the second insulating film are made of a material having the same composition and also have mutually different physical properties.

8. The electret electrode according to claim 1, wherein side surfaces of the first insulating film and the second insulating film are not covered with another conductive film or another insulating film.

9. The electret electrode according to claim 1, wherein the plurality of conductive films is disposed on a conductive substrate through an insulating film.

10. The electret electrode according to claim 1, wherein the plurality of conductive films is disposed on an insulating substrate.

11. The electret electrode according to claim 1, wherein the conductive films are electrically connected to an external terminal outside the region where the silicon oxide film retaining an electric charge is formed.

12. The electret electrode according to claim 3, wherein the third insulating film has a thickness larger than that of the fourth insulating film.

13. A vibration power generator provided with the electret electrode according to claim 1.

14. An electrostatic actuator provided with the electret electrode according to claim 1.

15. A vibration power generating device, comprising:
   the vibration power generator according to claim 13;
   a rectifier circuit configured to rectify an AC output voltage from the vibration power generator to convert the AC output into a DC voltage;
   a voltage conversion circuit configured to convert a DC voltage output from the rectifier circuit into a predetermined voltage level;
   an electric storage circuit configured to store a power generated by the vibration power generator when an output from the vibration power generating device is unnecessary;
   a voltage control circuit configured to control an output voltage from the voltage conversion circuit or the electric storage circuit to a predetermined voltage; and
   an output switching circuit configured to switch a circuit, to which an output from the voltage conversion circuit is sent, to the electric storage circuit or the voltage control circuit.

16. The vibration power generating device according to claim 15, wherein an output voltage from the voltage conversion circuit is set higher than an output voltage from the voltage control circuit.

17. A communication device comprising the power generating device according to claim 15.

18. The communication device according to claim 17, further comprising a battery.

19. The electret electrode according to claim 1, wherein the first insulating film and the second insulating film are made of materials capable of relieving stress generated during formation thereof.

20. An electret electrode, comprising:

a plurality of conductive films;

a plurality of silicon oxide films retaining an electric charge and disposed above the plurality of conductive films; and a plurality of insulating films, each insulating film of the plurality of insulating films being disposed between one of the conductive films and one of the silicon oxide films, the plurality of insulating films including a laminate having a first insulating film and a second insulating film so that the first insulating film is disposed on a proximal side of the one of the conductive films, wherein the conductive films are disposed only below a region where the silicon oxide films retaining an electric charge are disposed, the conductive films being spaced apart from each other, wherein the plurality of conductive films is surrounded by the first insulating film and the width of the plurality of conductive films is shorter than that of the first insulating film, and wherein each side surface of the plurality of insulating films is not covered with another conductive film or another insulating film.

* * * * *